United States Patent
Ting

(10) Patent No.: US 6,177,987 B1
(45) Date of Patent: Jan. 23, 2001

(54) LASER LEVEL

(76) Inventor: Chih-Yu Ting, 8F-6, No. 6, Lane 609, Chung Hsing Rd., Sec. 5, Sanchung, Taipei (TW)

(*) Notice: Under 35 U.S.C. 154(b), the term of this patent shall be extended for 0 days.

(21) Appl. No.: 09/030,544

(22) Filed: Feb. 26, 1998

(51) Int. Cl.[7] ............................... G01C 3/00; G01C 1/10
(52) U.S. Cl. ............................................. 356/148; 33/276
(58) Field of Search .................................... 356/147, 148, 356/149, 248, 250; 33/276, 277, 283, 285, 291

(56) References Cited

U.S. PATENT DOCUMENTS

| | | | |
|---|---|---|---|
| 5,619,802 | * | 4/1997 | Rando et al. ............................ 33/291 |
| 5,754,287 | * | 5/1998 | Clarke .................................. 356/250 |

* cited by examiner

Primary Examiner—Frank G. Font
Assistant Examiner—Michael P. Stafira
(74) Attorney, Agent, or Firm—A & J

(57) ABSTRACT

A laser level includes a transparent container, a buoy with a built-in laser component, and a support frame. The center of gravity of the buoy is always at the center of the buoy. One end of the buoy emits horizontal laser beams, the other end thereof emitting vertical laser beams. Two spindles respectively extend from both sides of the center of the buoy such that the spindles are perpendicular to the body of the buoy. The distance between the distal ends of the spindles is equivalent to the internal width of the container. Brackets are disposed on the inner wall of the container at a suitable height. The buoy is mounted on the brackets by means of the spindles to achieve balance and stability. The container is supported on the support frame so that it can be placed on surfaces of any uncertain plane. The container is filled with a liquid to the bottom rim of the buoy so that the buoy is always kept level on the liquid and the laser beams emitted from the buoy are always horizontal and vertical to achieve precise measurement.

2 Claims, 3 Drawing Sheets

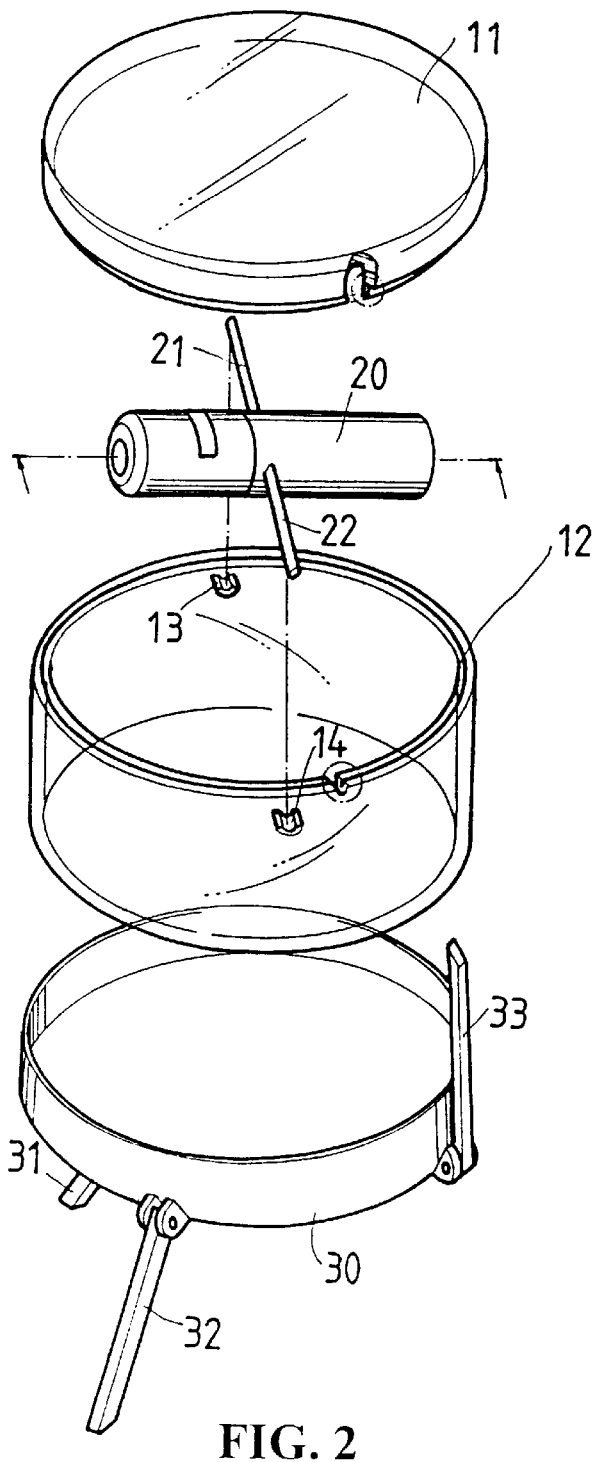
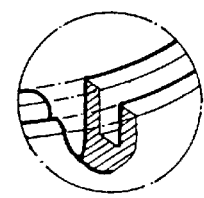
FIG. 2A
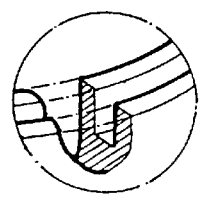
FIG. 2B
FIG. 2

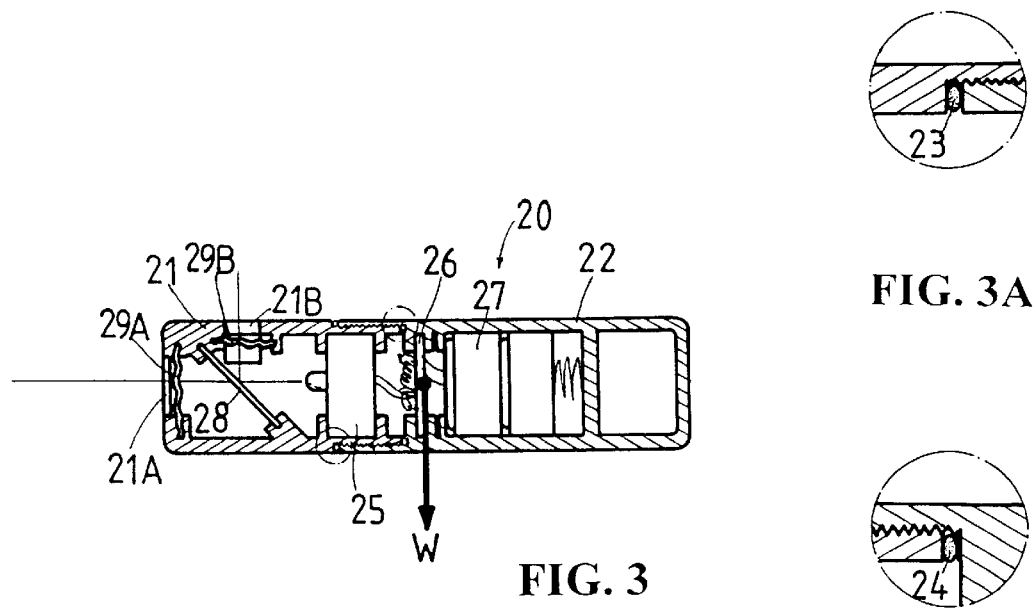
FIG. 3
FIG. 3A
FIG. 3B
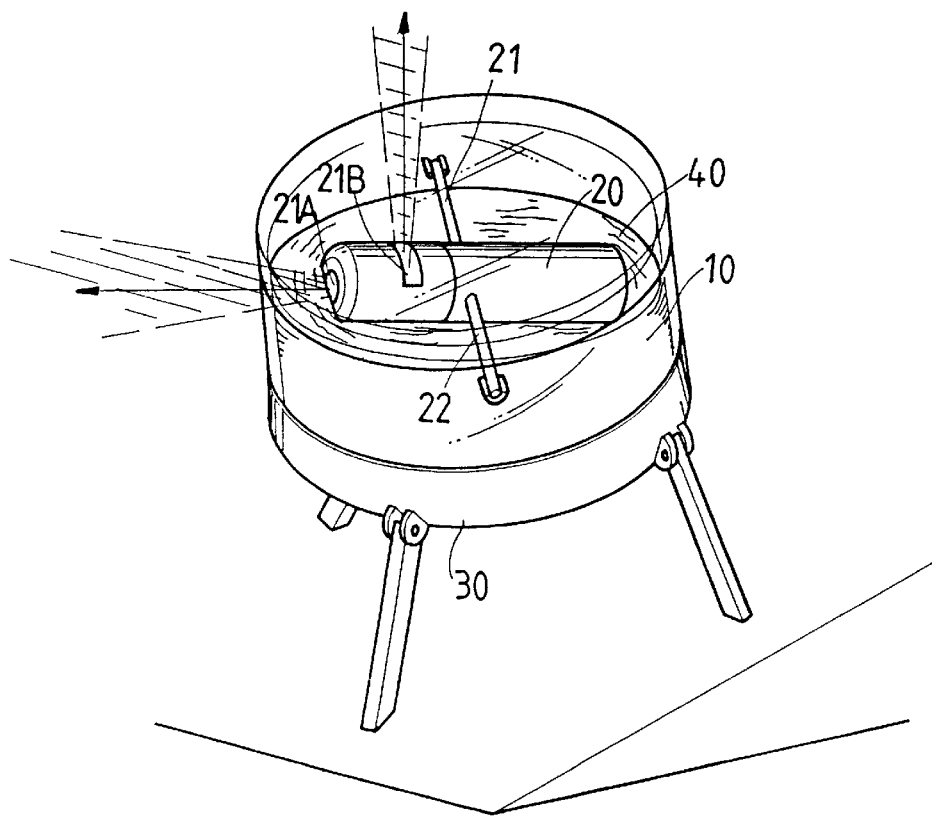
FIG. 4

LASER LEVEL

BACKGROUND OF THE INVENTION

1. Field of the Invention

The present invention relates generally to a laser level, and more particular to an instrument in which a laser device is provided inside a buoy which floats on a liquid in a transparent container, the laser beams emitted from the buoy being always kept horizontal and perpendicular to provide precise level measurement.

2. Description of the Prior Art

Since laser beams have good stability and linearity, lasers are generally used in measuring instruments. However, as the surface on which the laser equipment is erected is not always level even with the use of a tripod, the laser beams emitted are not horizontal or perpendicular.

SUMMARY OF THE INVENTION

The present invention relates generally to a laser level, and more particular to an instrument in which a laser device is provided inside a buoy which floats on a liquid in a transparent container, the laser beams emitted from the buoy being always kept horizontal and perpendicular to provide precise level measurement.

A primary object of the present invention is to provide a laser level, in which a laser generating device is disposed inside a buoy which floats on a liquid in a transparent container, the laser beams emitted from the buoy being always kept horizontal and vertical to achieve precise horizontal and vertical measurements.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2 is a perspective exploded view of the laser level of the present invention;

FIG. 2A is an enlarged fragmentary sectional view of FIG. 2;

FIG. 2B is another enlarged fragmentary sectional view of FIG. 2;

FIG. 3 is a sectional view taken along line 3—3 of FIG. 1;

FIGS. 3A and 3B are enlarged fragmentary sectional views showing the seal rings disposed between two tubular portions of the buoy; and FIG. 4 shows an embodiment of the laser level according to the present invention.

DETAILED DESCRIPTION OF THE PREFERRED EMBODIMENT

Figure 1:
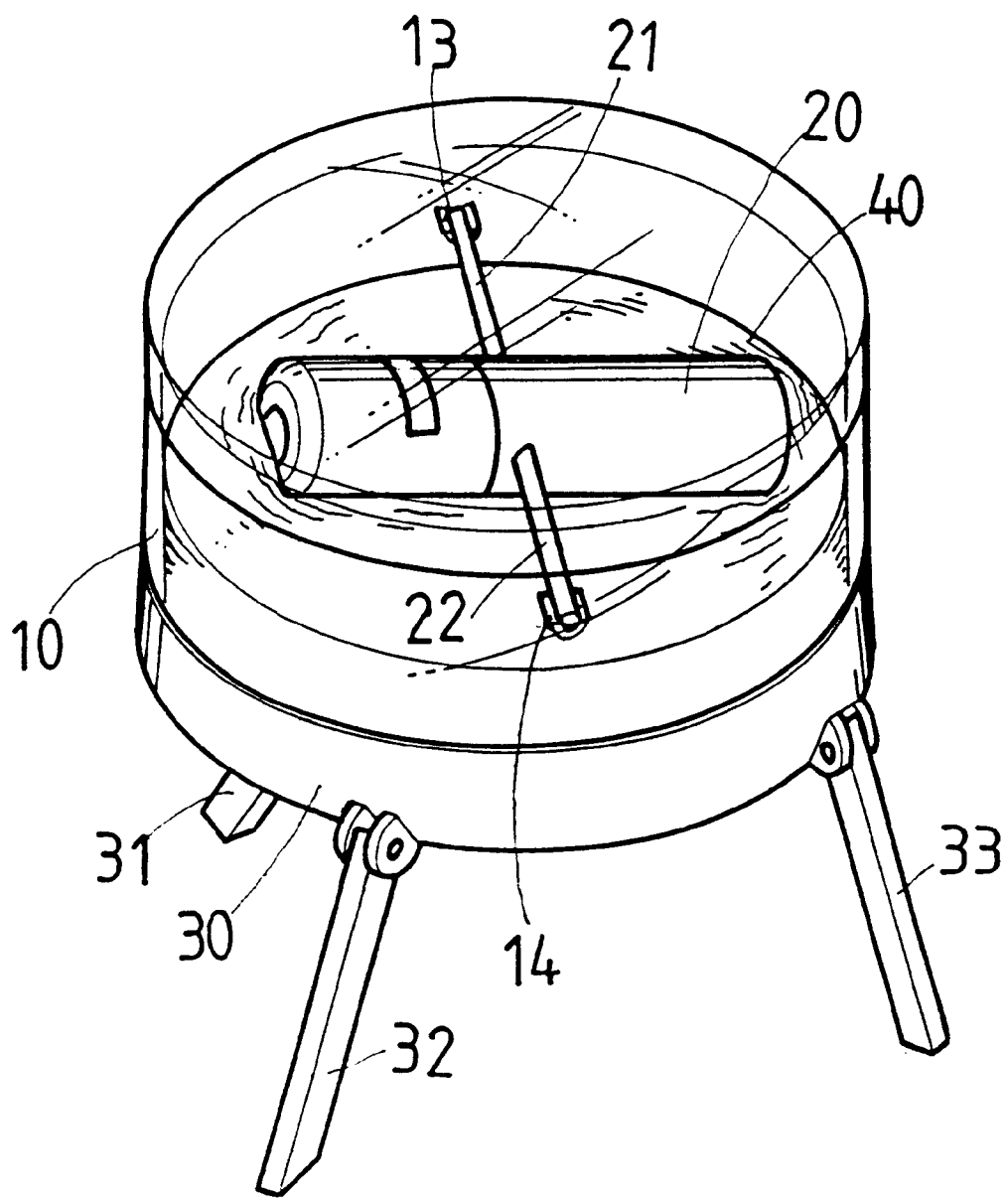
FIG. 1 is a perspective view of the laser level of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

FIG. 1 is a perspective view of the present invention. It can be seen from FIG. 1 that the present invention essentially comprises: a transparent container 10, a buoy 20 with built-in laser component, and a support frame 30. The container 10 has the buoy 20 pivotally disposed therein and is filled with a liquid 40 (of good fluidity such as water or mercury) so that the buoy 20 may float on the liquid 40. The support frame 30 is disposed below the lower rim of the container 10 and has three foldable legs 31, 32 and 33 so that the container 10 may be supported on any surface of an uncertain plane.

FIGS. 2, 2A and 2B show the detailed structure of the present invention. The container 10 may be dismantled into an upper lid 11 and a bottom 12 to facilitate removal of the buoy 20 from the container 10. The buoy 20 has two spindles 21, 22 respectively extending from both sides of a center thereof. The spindles 21, 22 are perpendicular to the body of the buoy 20. The distance between the distal ends of the spindles 21, 22 is just equal to the internal width of the container 10. Brackets 13, 14 are provided on the inner wall of the container 10 at suitable positions to match the distal ends of the spindles 21, 22 so that the buoy 20 may have the distal ends of its spindles 21, 22 supported on the brackets 13, 14 to achieve balance and stability. The support frame 30 is installed below the container 10 so that the container 10 may rest on a surface of an uncertain plane. The detailed structure of the inside of the buoy 20 is illustrated in FIGS. 3, 3A and 3B. The housing of the buoy 20 may comprise two tubular portions 21, 22 screwably locked in a butt joint relationship. Seal rings 23, 24 are disposed at the joints between the threads of the tubular portions to avoid water leakage. The housing thus formed accommodates therein a laser generator 25, a laser control circuit 26, a battery unit 27, a spectroscope 28, and two ruffled lenses 29A, 29B, such that the center of gravity W of the buoy 20 is at the center of the buoy 20. The spectroscope 28 is mounted at that end of the laser generator 25, which generates laser beams so that it may divide the laser beams into horizontal and perpendicular ones. The ruffled lenses 29A, 29B are insertably provided at where the spectroscope 28 divides the beams and near the wall of the tubular portion 21 so that the laser beams may horizontally disperse. Transparent lens surfaces 21A, 21B are formed at the wall of the tubular portion 21 corresponding to where the ruffled lenses 29A, 29B emit light.

In use, referring to FIG. 4, the support frame 30 is used to support the container 10 and the buoy 20 on any surface. The container 10 is filled with the liquid 40 until the bottom rim of the buoy 20. By utilizing the fluidity of the liquid 40 to always keep the buoy 20 level, the buoy 20 is subject to the effect of the liquid 40 so that the center of the spindles 21, 22 at both sides thereof float to a level position, without being affected by the inclination of the surface on which the container 10 is placed, thus ensuring that the laser beams are horizontal and perpendicular. The laser beams are emitted through the transparent container 10 (the container 10 is designed to have good transparency and very thin walls to obtain minimal light deflection so that there is no need to consider the effect of the deflection of light on the container 10). It can therefore be seen that the present invention may provide precise measurement.

From the above, it can be appreciated that the present invention may be erected on surfaces of any plane to provide precise horizontal or perpendicular laser indication.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A laser level, comprising:

a transparent container, a buoy, having a laser generating device disposed therein; and a support frame said buoy has its center of gravity always at a center thereof, one end of said buoy emitting horizontal laser beams, with the other end thereof emitting vertical laser beams, said center of said buoy having a spindle extending from either side thereof, said spindles being perpendicular to the body of said buoy, the distance between the distal ends of said spindles being equivalent to the internal width of said transparent container, brackets being provided at the inner wall of said transparent container at a suitable height to match said spindles of said buoy, said buoy being supported on said brackets by means of said spindles to achieve balance and stability, said support frame being mounted below a lower rim of said transparent container so that said container may be supported on surfaces of any uncertain plane, wherein said transparent container is filled with a liquid to a lower rim of said buoy such that said buoy may always be level and the laser beams may always be horizontal and vertical to achieve precise measurement.

2. The laser level as defined in claim 1, wherein said buoy is comprised of two tubular portions screwably locked in a butt joint relationship to form a housing, seal rings being disposed at the joints between the threads of said tubular portions to avoid water leakage, said housing accommodating therein a laser generator, a laser control circuit, a battery unit, a spectroscope, and two ruffled lenses, all of which are evenly distributed in said housing so that the center of gravity of said buoy is always at the center, said spectroscope being mounted at that end of said laser beams generator to split the laser beams into horizontal and vertical ones, said ruffled lenses being insertably provided at where said spectroscope splits the laser beams and near the wall of said tubular portions, and transparent lens surfaces being formed at the wall of said tubular portions corresponding to where said ruffled lenses emit light.

* * * * *